United States Patent [19]
Ito et al.

[11] Patent Number: 4,675,831
[45] Date of Patent: Jun. 23, 1987

[54] METHOD OF PROCESSING GRADATION INFORMATION

[75] Inventors: Masahiro Ito, Kawasaki; Noboru Murayama, Machida, both of Japan

[73] Assignee: Ricoh Company, Ltd., Tokyo, Japan

[21] Appl. No.: 646,504

[22] Filed: Aug. 31, 1984

[30] Foreign Application Priority Data

Sep. 9, 1983 [JP] Japan .................. 58-161692

[51] Int. Cl.$^4$ ............................... H04N 1/40
[52] U.S. Cl. ..................... 364/518; 358/298
[58] Field of Search ............. 364/518, 519; 346/154; 358/298, 280, 283; 365/190, 238

[56] References Cited

U.S. PATENT DOCUMENTS

4,485,397 11/1984 Schenter et al. ............ 358/298

Primary Examiner—Arthur G. Evans
Attorney, Agent, or Firm—Mason, Fenwick & Lawrence

[57] ABSTRACT

A mother matrix pattern MMP is divided into (m×n) child matrix patterns $CMP_{11}$-$CMP_{mn}$ comprising m patterns in the main scanning direction and n patterns in the sub-scanning direction, where the first foot-character denotes the position of each child matrix pattern within the mother matrix pattern in the main scanning direction and the latter foot-character denotes the position thereof in the sub-scanning direction, the mother matrix pattern being expressed by;

$$MMP = \sum_{j=1}^{n} \sum_{i=1}^{m} CMP_{ij}$$

and image information corresponding to one mother matrix pattern is obtained with (m×n) gradation data $$\sum_{j=1}^{n} \sum_{i=1}^{m} ICD_{ij}$$

comprising $ICD_{11}$-$ICD_{mn}$ similarly, information of the child matrix pattern $CMP_{ij}$ in the mother matrix pattern specified with the gradation data $ICD_{ij}$ is obtained as information in the form of bit distribution for the gradation data $ICD_{ij}$. In other words, the position of each of the child matrix patterns for obtaining image information in accordance with both array of one mother matrix pattern and (m×n) gradation data is located in a position corresponding to the position of the gradation data within the mother matrix pattern. The reproduced image is thus formed in such a fashion that (m×n) child matrix patterns having information of the respective mother matrix patterns in accordance with the respective gradation data and locating in predetermined positions to constitute one mother matrix pattern are arrayed in an area of the reproduced image corresponding to one mother matrix pattern.

11 Claims, 25 Drawing Figures

Fig.1

| 58 | 53 | 39 | 28 | 27 | 42 | 54 | 59 |
|----|----|----|----|----|----|----|----|
| 48 | 40 | 21 | 14 | 13 | 20 | 41 | 49 |
| 34 | 22 | 10 | 4  | 3  | 9  | 19 | 35 |
| 29 | 15 | 5  | 1  | 2  | 8  | 18 | 32 |
| 38 | 23 | 11 | 6  | 7  | 12 | 26 | 37 |
| 52 | 45 | 24 | 16 | 17 | 25 | 44 | 51 |
| 62 | 56 | 46 | 30 | 31 | 43 | 55 | 61 |
| 63 | 57 | 47 | 33 | 36 | 50 | 60 | 63 |

ORIGINAL MOTHER PATTERN 1

| 14 | 24 | 52 | 55 | 53 | 46 | 22 | 12 |
|----|----|----|----|----|----|----|----|
| 34 | 50 | 41 | 27 | 25 | 39 | 48 | 32 |
| 60 | 43 | 19 | 7  | 5  | 17 | 37 | 62 |
| 57 | 29 | 9  | 1  | 3  | 15 | 35 | 63 |
| 54 | 45 | 21 | 11 | 13 | 23 | 51 | 56 |
| 26 | 40 | 47 | 31 | 33 | 49 | 42 | 28 |
| 6  | 18 | 38 | 59 | 61 | 44 | 20 | 8  |
| 4  | 16 | 36 | 63 | 58 | 30 | 10 | 2  |

ORIGINAL MOTHER PATTERN 2

| 38 | 13 | 9  | 44 | 40 | 15 | 12 | 42 |
|----|----|----|----|----|----|----|----|
| 17 | 1  | 5  | 29 | 19 | 3  | 7  | 31 |
| 55 | 21 | 25 | 49 | 53 | 23 | 27 | 51 |
| 59 | 35 | 45 | 61 | 57 | 33 | 47 | 63 |
| 39 | 16 | 11 | 41 | 37 | 14 | 10 | 43 |
| 20 | 4  | 8  | 32 | 18 | 2  | 6  | 30 |
| 54 | 24 | 28 | 52 | 56 | 22 | 26 | 50 |
| 58 | 34 | 48 | 63 | 60 | 36 | 46 | 62 |

ORIGINAL MOTHER PATTERN 3

| 54 | 25 | 17 | 48 | 56 | 27 | 19 | 46 |
|----|----|----|----|----|----|----|----|
| 33 | 1  | 9  | 57 | 35 | 3  | 11 | 59 |
| 23 | 41 | 49 | 29 | 21 | 43 | 51 | 31 |
| 15 | 63 | 37 | 5  | 13 | 61 | 39 | 7  |
| 55 | 28 | 20 | 45 | 53 | 26 | 18 | 47 |
| 36 | 4  | 12 | 60 | 34 | 2  | 10 | 58 |
| 22 | 44 | 52 | 32 | 24 | 42 | 50 | 30 |
| 14 | 62 | 40 | 8  | 16 | 63 | 38 | 6  |

ORIGINAL MOTHER PATTERN 4

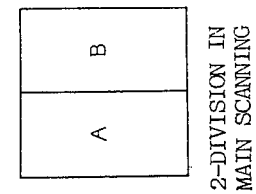
Fig.3e 64-DIVISION (BIT-TO-BIT)
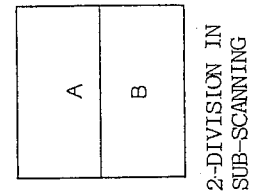
Fig.3d 16-DIVISION
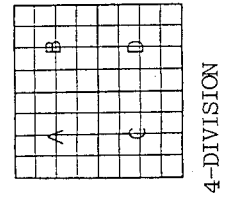
Fig.3c 4-DIVISION
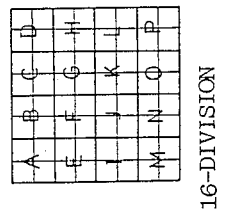
Fig.3b 2-DIVISION IN SUB-SCANNING DIRECTION
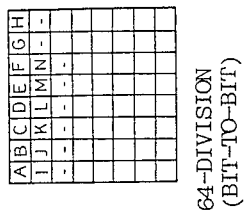
Fig.3a 2-DIVISION IN MAIN SCANNING DIRECTION

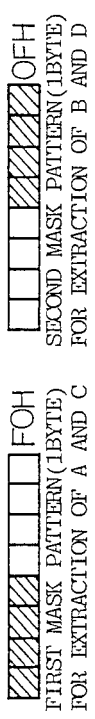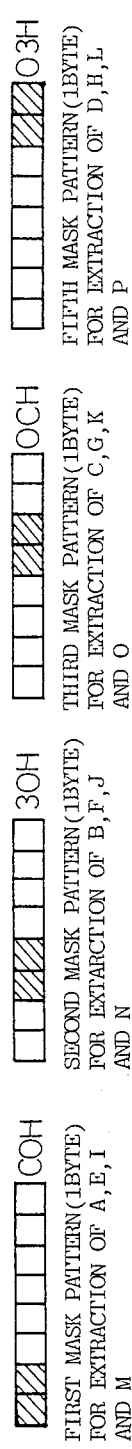
Fig.4a
Fig.4b

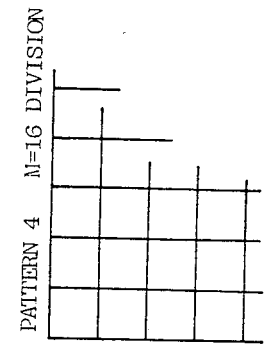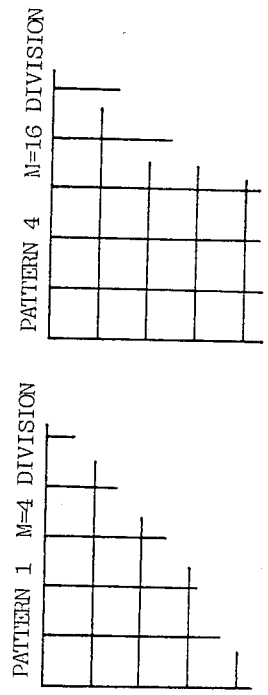

METHOD OF PROCESSING GRADATION INFORMATION

FIELD OF THE INVENTION

The present invention relates to image information processing of half tone images such as photographs or painted pictures, and more particularly, to processing of gradation information for use in producing bit distribution pattern data indicative of a half tone image on basis of gradation data.

DESCRIPTION OF THE PRIOR ART

As one of methods of processing gradation information, there is known a fixed density pattern system (dither system) in which a pattern corresponding to the density indicated by gradation data is specified (selected) out of a plurality of half tone matrix patterns, each of which has the given number of bits and contains record (display) information bits distributed in a specific manner, and the bit information thus specified is loaded in a page memory or buffer memory in correspondence relation with locations on recording (display) of the gradation data.

In such a system, however, because the density is usually made correspondent with the number of pixels (or bits) in a matrix, an increase in the number of represented gradations may result in a disadvantage that the matrix itself is enlarged in its size and resolution is hence degraded due to the fact that one matrix is extracted on basis of one gradation datum. On the other hand, a decrease in the matrix size may result in a disadvantage that smooth transition of half tones is degraded, because resolution is enhanced but the number of represented gradations is reduced.

From this reason, there has been heretofore proposed a method in which the size of matrix is changed in accordance with coarseness of the image to obtain the appropriate image information (e.g., Japanese Patent Laid-Open Print No. 57-159173). However, this method gives rise problems in points of accuracy and complexity accompanied with decision on coarseness of the image, as well as the enlarged amount of permanent memory data because a variety of different matrixes must be prepared.

There has also been proposed another method of processing gradation information (e.g., Japanese Patent Laid-Open Print No. 57-159174) in which one large matrix pattern (4 types×4 pixels=16 pixels : 4 types×5 gradations=20 gradations) consists of a plurality (four) of different small matrix patterns (4 pixels: 5 gradations), the individual small matrix patterns are fixed in their positions within the large matrix pattern for each type of the former, and gradation data is allocated to particular one of the small matrix patterns in accordance with the arranged sequence of the data on the corresponding image so as to obtain image information for each of the small matrix patterns. With this method, image information represented by one large matrix pattern is composed of image informations represented by a plurality (four) of small matrix patterns. Stated differently, one large matrix pattern is specified by a plurality (four) of gradation data.

However, the above method simply realized that image information of large matrix pattern is determined by a plurality (four) of small matrix patterns, i.e., that the large matrix pattern is determined by a plurality (four) of gradation data. Thus, the small matrix patterns practically serve to determine resolution as well as smoothness of gradations, and the large matrix pattern will contribute to an improvement of such smoothness to a very small extent. More specifically, the above method can not eliminate the substantial problem of the dither system that an irregular or regular pattern will occur in the reproduced image, because the small matrix pattern of the same type appears with given intervals (every other small matrix pattern), and the large matrix pattern can be regarded as analogous to one patrition comprising plural regions of a matrix pattern in the conventional dither system, whereby it is not so expected for the large matrix pattern to contribute to improve smoothness of gradations.

SUMMARY OF THE INVENTION

It is an object of the present invention to simultaneously achieve an improvement in resolution due to small matrix partition as well as an improvement in smoothness of gradations due to large matrix partition.

To achieve the above object, according to the present invention, a mother matrix pattern as a large matrix pattern is specified with gradation data, and information of a child matrix pattern as a small matrix pattern and constituting a part of the mother matrix pattern is extracted to obtain image information with the child matrix being allocated to the gradation data.

This causes the gradation pattern to be updated for each child matrix pattern, so that resolution is enhanced to improve reproducibility of, for example, a profile of the face in a photographic image or edge portions of a line drawing. In case of profile lines of an image, for example, the child matrix patterns correspoding to such profile lines constitute each a part of the mother matrix pattern with high density, whereby the profile lines appear clearly. As to the low density portion out of the profile lines, the child matrix patterns corresponding to such portion constitute each a part of the mother matrix pattern with low density, whereby the low density image is reproduced. As a whole, the profile becomes clear.

Since the large matrix pattern is specified with gradation data, smoothness of gradations is also improved in the portion where changes in density is not so distinct, but gradation is varied a little by a little. More specifically, the reproduced image is formed in such a fashion that the child matrix patterns in the number necessary to constitute one mother matrix pattern and each having information of the mother matrix pattern in accordance with the gradation data are arrayed in an area of the reproduced image corresponding to one mother matrix pattern. Therefore, since the mother matrix patterns which correspond to represented densities not so different are analogous to one another in their pattern modes, the reproduced image given by the child small matrix patterns in the number of constituting one mother matrix pattern is analogous to that of a particular one mother matrix pattern in the portion of the image where density is changed slowly, so that the number of represented gradations becomes almost equal to that given by the particular mother matrix pattern.

In a preferred embodiment of the present invention, assuming that a mother matrix pattern MMP is divided into (m×n) child matrix patterns $CMP_{11}$-$CMP_{mn}$ comprising m patterns in the main scanning direction and n patterns in the sub-scanning direction, where the first foot-character denotes the position of each child matrix pattern within the mother matrix pattern in the main scanning direction and the latter foot-character denotes the position thereof in the sub-scanning direction, the mother matrix pattern being expressed by:

$$MMP = \sum_{j=1}^{n} \sum_{i=1}^{m} CMP_{ij}$$

and image information corresponding to one mother matrix pattern is obtained with (m×n) gradation data $$\sum_{j=1}^{n} \sum_{i=1}^{m} ICD_{ij}$$

comprising $ICD_{11}-ICD_{mn}$ similarly, information of the child matrix pattern $CMP_{ij}$ in the mother matrix pattern specified with the gradation data $ICD_{ij}$ is obtained as information in the form of bit distribution for the gradation data $ICD_{ij}$.

In other words, the position of each of the child matrix patterns for obtaining image information in accordance with both array of one mother matrix pattern and (m×n) gradation data is located in a position corresponding to the position of the gradation data within the mother matrix pattern.

The reproduced image is thus formed in such a fashion that (m×n) child matrix patterns having information of the respective mother matrix patterns in accordance with the respective gradation data and locating in predetermined positions to constitute one mother matrix pattern are arrayed in an area of the reproduced image corresponding to one mother matrix pattern.

With the above, since the mother matrix patterns which correspond to represented densities not so different are analogous to one another in their pattern modes, the reproduced image given by (m×n) child matrix patterns is highly analogous to that of a particular one mother matrix pattern in the portion of the image where density is changed slowly, so that the number of represented gradations becomes almost equal to that given by the particular mother matrix pattern. This results in similar density representation as resulted from the conventional fixed density pattern process using a mother matrix pattern.

At profile lines of an image, for example, the child matrix patterns corresponding to such profile lines is each a part of the mother matrix pattern with high density, whereby the profile lines appear clearly. As to the low density portion out of the profile lines, the child matrix patterns corresponding to such portion is each a part of the mother matrix pattern with low density, whereby the low density image is reproduced. As a whole, the profile becomes still more clearer. When the number of (m×n) is selected to be the same as the pixel numbers of the mother matrix pattern, the present method provides the similar effect as attained by the dither system.

Other objects and features, together with the foregoing, are attained in the embodiments described in the following description and illustrated in the accompanying drawings.

BRIEF DESCRIPTION OF THE DRAWINGS

FIG. 1 is a plan view showing the content of each original mother pattern which stores therein threshold data for use in forming mother matrix patterns;

FIGS. 3a, 3b, 3c, 3d 3e are plan views showing the positions of child matrix patterns within the mother matrix pattern, the child matrix patterns being denotes by capital alphabet letters;

FIGS. 4a and 4b are plan views showing the contents of mask patterns in which the hatched portion denotes extraction command data "1" and the blank portion denotes non-extraction command data "0";

FIGS. 7a and 7b are plan views showing distribution of the gradation data in correspondence relation with the image surace;

FIGS. 8a and 8b are plan views showing distribution of child matrix patterns in accordance with distribution of gradation data;

DESCRIPTION OF THE PREFERRED EMBODIMENT

Figure 2A:
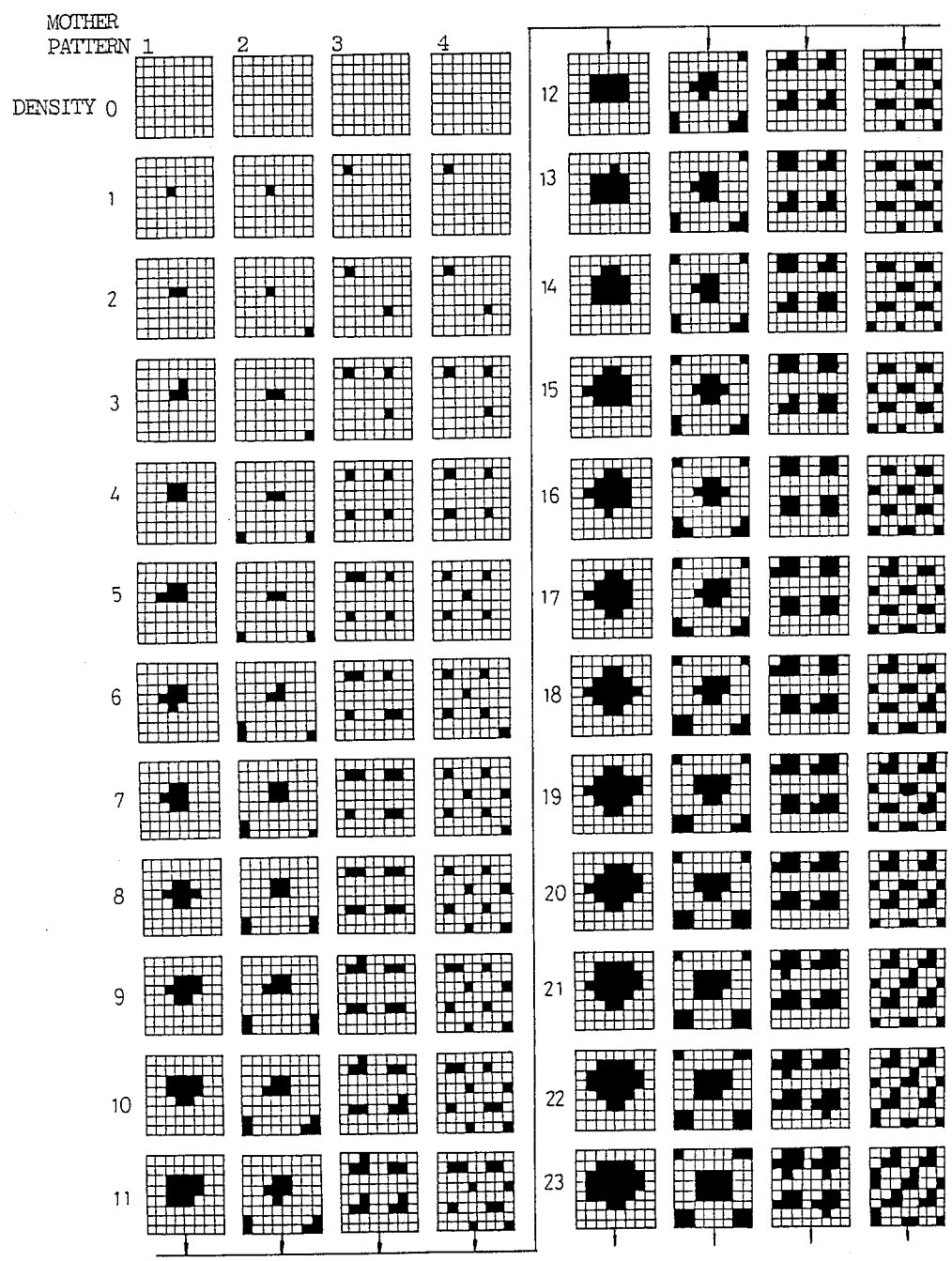
FIGS. 2a and 2b are plan views showing the contents of the mother matrix patterns.

One preferred embodiment of the present invention will be hereinafter described on assumption that each mother matrix pattern comprises 8×8 bits (pixels) to represent 64 gradations of density No. 0–63, four types of mother matrix patterns are prepared to represent gradations with sufficient variety, and the mother matrix patterns are obtained by comparing original mother patterns (four types) each having 64 threshold data with gradation data indicative of density No.

Referring to FIG. 1, there is shown distribution of threshold data of each original mother pattern (i.e., threshold matrix pattern). Gradation data (i.e., data indicating a value of density No. 0–63 in this embodiment) is compared with each of thresholds in the original mother pattern while updating and reading them in such a fashion that the thresholds in the uppermost line are first read out in the horizontal direction (hereinafter referred to as main scanning direction), then the thresholds in the next line shifted from the uppermost line by one line in the vertical direction (hereinafter referred to as sub-scanning direction) are read out in the main scanning direction, and then such reading process is repeated. The compared results are written into bits in a pattern memory of 8×8 bit matrix corresponding to locations of the individual thresholds under conditions that if the gradation data is equal to or larger than the thresholds, a high level "1" is written in the pattern memory, while the gradation data is smaller than the thresholds, a low level "0" is written therein. The content of the pattern memory thus obtained provides each mother matrix pattern in accordance with the gradation data.

Four original mother patterns are prepared to attain four types of mother matrix patterns.

The original mother pattern 1 is so formed that smaller value thresholds for providing low density are arranged in the center of the pattern, and larger value thresholds for providing high density are arranged in the periphery thereof. Mother matrix patterns 1 (image information patterns stored in the pattern memory in accordance with the gradation data) resulted from the original mother pattern 1 are shown in the leftmost column (vertical line) in FIGS. 2a and 2b.

The original mother pattern 2 is so formed that the thresholds for providing low density are allocated to the center of the pattern and the outer four corners thereof in sequence. Mother matrix patterns 2 resulted from the original matrix patterns 2 are shown in the second column from left in FIGS. 2a and 2b.

The original mother pattern 3 is so formed that the thresholds for providing low density are distributed in the pattern to locate at respective four points spaced from each other with almost equal spacings. Mother matrix patterns 3 resulted from the original mother pattern 3 are shown in the third column from left in FIGS. 2a and 2b.

The original mother pattern 4 is so formed that the thresholds are distributed in such a manner as dispersing recording (display) dots over the entire pattern. Mother matrix patterns 4 resulted from the original mother pattern 4 are shown in the rightmost column in FIGS. 2a and 2b.

Next, extraction of image information will be described on assumption that each mother matrix pattern (one of the patterns shown in FIGS. 2a and 2b) is formed in the pattern memory in accordance with gradation representation mode command data (i.e., data for specifying one N of the original mother patterns 1-4) as well as gradation data.

When the mother matrix pattern is divided into halves, designated at A and B are child matrix patterns shown in FIGS. 3a and 3b.

Figure 2B:
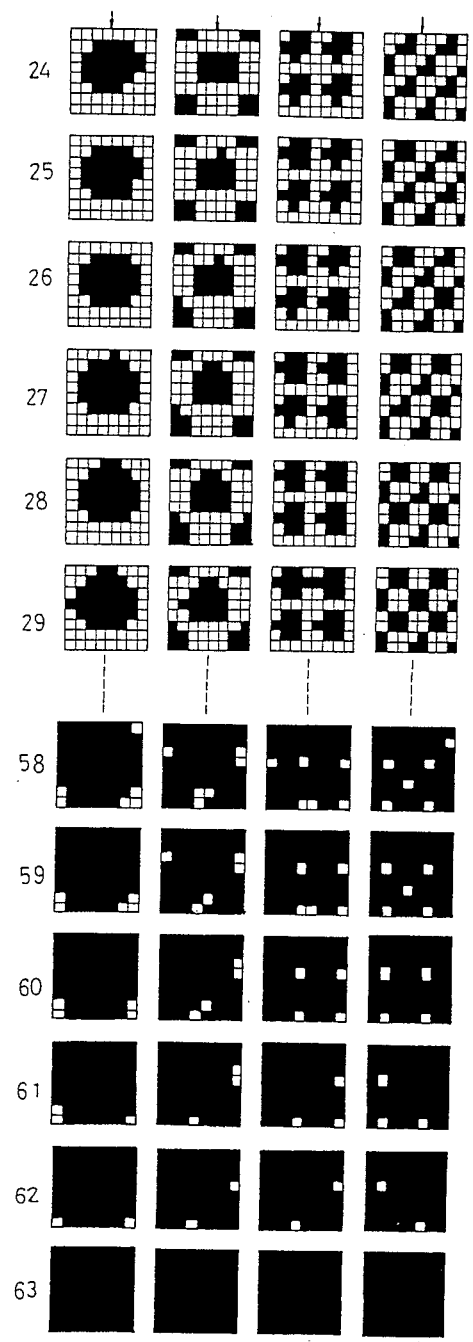

In case of division into child matrix patterns as shown in FIG. 3a, when the gradation representation mode command data gives N=1 and the gradation data indicates 11, the data in the left half of the leftmost and lowermost pattern in FIG. 2a is extracted, and when the next gradation data indicates 10, the data in the right half of the leftmost and second pattern from bottom in FIG. 2a is extracted. When the next gradation data indicates 9, the data in the left half of the leftmost and third pattern from bottom in FIG. 2a is extracted. When the next gradation data indicates 1, the data in the right half of the leftmost and second pattern from above in FIG. 2a is extracted.

In case of division into child matrix patterns as shown in FIG. 3b, when the gradation representation mode command data gives N=1 and the gradation data indicates 11, the data in the upper half of the leftmost and lowermost pattern in FIG. 2a is extracted, and when the next gradation data indicates 10, the data in the upper half of the leftmost and second pattern from bottom in FIG. 2a is extracted. When the next gradation data indicates 9, the data in the upper half of the leftmost and third pattern from bottom in FIG. 2a is extracted. When the next gradation data indicates 1, the data in the upper half of the leftmost and second pattern from above in FIG. 2a is extracted. After image information has been completely converted for the gradation data in the first row (or the row in odd numbers) in the main scanning direction as mentioned above, such conversion is now made on the next row (or the row in even numbers) and, when the gradation data indicates 10, the data in the lower half of the leftmost and second pattern from bottom in FIG. 2a is extracted. When the next gradation data indicates 9, the data in the lower half of the leftmost and third pattern from bottom in FIG. 2a is extracted. When the gradation data indicates 1, the data in the lower half of the leftmost and second pattern from above in FIG. 2a is extracted.

Referring to FIG. 3c, there is shown an example in which the mother matrix pattern is divided into four child matrix patterns A-D. With this example, when the gradation representation mode command data gives N=1 and the gradation data indicates 11, the data in the left, upper quarter (corresponding to A in FIG. 3c) of the leftmost and lowermost pattern in FIG. 2a is extracted and, when the next gradation data indicates 10, the data in the right, upper quarter (corresponding to B in FIG. 3c) of the leftmost and second pattern from bottom is extracted. When the next gradation data indicates 9, the data in the left, upper quarter (corresonding to A in FIG. 3c) of the leftmost and third pattern from bottom in FIG. 2a is extracted. When the next gradation data indicates 1, the data in the right, upper quarter (corresponding to B in FIG. 3c) of the leftmost and second pattern from above is extracted. After image information has been completely converted for the gradation data in the first row (or the row in odd numbers) in the main scanning direction as mentioned above, such conversion is now made on next row (or the row in even numbers) and, when the gradation data indicates 10, the data in the left, lower quarter (corresponding to C in FIG. 3c) of the leftmost and second pattern from bottom in FIG. 2a is extracted. When the next gradation data indicates 9, the data in the right, lower quarter (corresponding to D in FIG. 3c) of the leftmost and third pattern from bottom in FIG. 2a is extracted. When the next gradation data indicates 1, the data in the left, lower quarter (corresponding to C in FIG. 3c) of the leftmost and second pattern from above in FIG. 2a is extracted.

In case the mother matrix pattern is divided into 16 child matrix patterns A-P as shown in FIG. 3d, and in case the mother matrix pattern is divided into 64 child matrix patterns A, B, C, . . . as shown in FIG. 3e, the mother matrix pattern is first formed or specified with the gradation data, and image information of the child matrix pattern is then extracted which locates in a position corresponding to the position within the mother matrix pattern to which the gradation data is to be allocated, in a similar manner as above.

The foregoing division into child matrix patterns and extraction of image information can be generalized as follows.

Assuming that a mother matrix pattern MMP is divided into (m×n) child matrix patterns $CMP_{11}$-$CMP_{mn}$ comprising m patterns in the main scanning direction and n patterns in the sub-scanning direction, where the first foot-character denotes the position of each child matrix pattern within the mother matrix pattern in the main scanning direction and the latter foot-character denotes the position thereof in the sub-scanning direction, the mother matrix pattern being expressed by:

$$MMP = \sum_{j=1}^{n} \sum_{i=1}^{m} CMP_{ij}$$

and image information corresponding to one mother matrix pattern is obtained with (m×n) gradation data $$\sum_{j=1}^{n} \sum_{i=1}^{m} ICD_{ij}$$

comprising $ICD_{11}$–$ICD_{mn}$ similarly, information of the child matrix pattern $CMP_{ij}$ in the mother matrix pattern specified with the gradation data $ICD_{ij}$ is obtained as information in the form of bit distribution for the gradation data $ICD_{ij}$.

Assuming now that the gradation data is distributed as shown in FIG. 7a, the original mother pattern 1 is instructed and 4-division mode is instructed, the gradation data becomes:

| | |
|---|---|
| $ICD_{11} = 12$, $ICD_{21} = 14$, | $ICD_{11} = 16$, $ICD_{21} = 18$, |
| $ICD_{12} = 17$, $ICD_{22} = 19$, | $ICD_{12} = 21$, $ICD_{22} = 20$, |
| $ICD_{11} = 22$, $ICD_{21} = 24$, | $ICD_{11} = 21$, |
| $ICD_{12} = 27$, $ICD_{22} = 22$ | | and the reproduced image data has distribution as shown in FIG. 8a. More specifically, the reproduced image data is such that the child matrix patterns are arrayed in accordance with distribution of the gradation data as follows.

It is to be noted that the head numeral denotes a mother matrix pattern out of the mother matrix pattern 1, which is allocated to the density indicated by the head numeral.

| | |
|---|---|
| $CMP_{11}$ of 12, $CMP_{21}$ of 14 | $CMP_{11}$ of 16, $CMP_{21}$ of 18 |
| $CMP_{12}$ of 17, $CMP_{22}$ of 19 | $CMP_{12}$ of 20, $CMP_{22}$ of 20 |
| $CMP_{11}$ of 22, $CMP_{21}$ of 24 | $CMP_{11}$ of 21 |
| $CMP_{12}$ of 27, $CMP_{22}$ of 22 | |

Figure 9B:
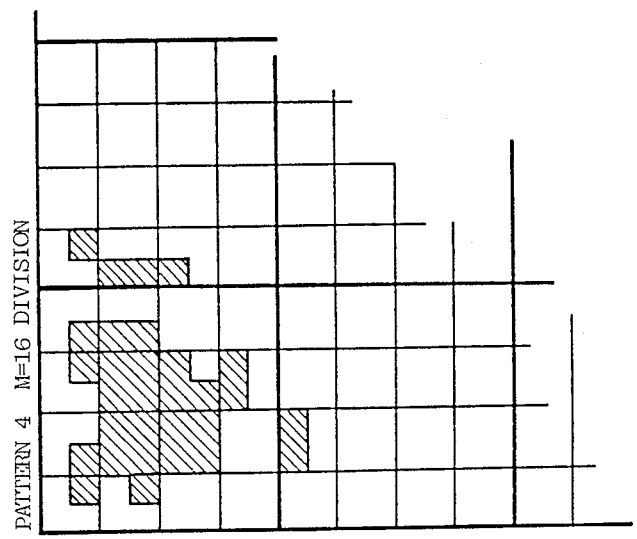
FIGS. 9a and 9b are plan views showing image information of the child matrix patterns in a developed manner on the image surface in which the hatched portion denotes "1" indicative of recording (display) and the blank portion denotes "0" indicative of non-recording.
Figure 9A:
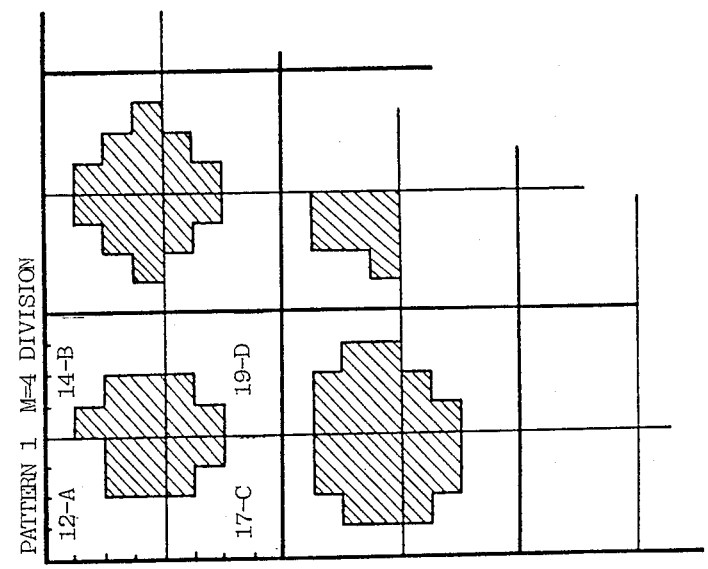

In the above, the rectangular area surrounded by solid lines corresponds to the size of one mother matrix pattern. In FIG. 8a, the rectangular area surrounded by thick lines corresponds to the size of one mother matrix pattern. The reproduced image is formed as shown in FIG. 9a.

When image information is reproduced with 16 division mode (the mode of FIG. 3d) in case of the gradation data array as shown in FIG. 7b, the child matrix patterns are arrayed as shown in FIG. 8b. In FIG. 8b, the rectangular area surrounded by thick lines corresponds to the size of one mother matrix pattern. It is to be noted that each numeral in FIG. 8a denotes a mother matrix pattern out of the mother matrix patterns 4, which is allocated to the density indicated by the numeral.

Extraction of the child matrix pattern A shown in FIG. 3a and the child matrix patterns A, C shown in FIG. 3c is performed by taking the logical product between a mask pattern of 1 Byte as shown in FIG. 4a and on-line data of the mother matrix pattern in the main scanning direction, from which the child matrix pattern is extracted. The resultant logical product is stored in a page memory or buffer memory. The above process is repeated for eight lines. The mask pattern shown in FIG. 4a stores "1" in locations corresponding to the parts thereof (indicated by hatches in the figure) from which the data is to be extracted, and stores "0" in locations corresponding to the parts thereof from which the data is not to be extracted. Namely, the mask pattern shown in FIG. 4a is of data indicating FOH.

Extraction of the child matrix pattern B shown in FIG. 3a and the child matrix patterns B, D is performed by taking the logical product between a mask pattern of 1 Byte as shown in FIG. 4b and one-line data of the mother matrix pattern in the main scanning direction, from which the child matrix pattern is extracted. Since "0" is stored in the page memory or buffer memory in accordance with the non-extraction parts of the previous logical product memory, the data in the storage enable regions of the page memory or buffer memory is read out to take the logical sum between the read-out data and the above logical product, the resultant logical sum being stored in the page memory or buffer memory while updating the same. The above process is repeated for eight lines. The mask pattern is shown in FIG. 4b also stores "1" in locations corresponding to the parts thereof (indicated by hatches in the figure) from which the data is to be extracted, and stores "0" at locations corresponding to the parts thereof from which the data is not to be extracted. The mask pattern shown in FIG. 4b is of data indicating FOH.

Likewise, in case of extracting pattern information with the division mode of child matrix patterns illustrated in FIG. 3d, the mask pattern of COH as shown in FIG. 4b is used for extraction of the child matrix patterns A, E, I and M, the mask pattern of 30H is used for extraction of the child matrix patterns B, F, J and N, the mask pattern of OCH is used for extraction of the child matrix patterns C, G, K and O, and the mask pattern of 03H is used for extraction of the child matrix patterns D, H, L and P.

In this connection, the data (logical product) resulted from extraction of A, E, I and M are directly written in the page memory or buffer memory. On the other hand, the data (logical product) resulted from extraction of B, F, J and N, C, G, K and O as well as D, H, L and P are stored in the page memory or buffer memory to become updated data, after taking the logical sum between the above extracted data and the data previously written in the page memory or buffer memory.

As to the division mode of child matrix patterns shown in FIG. 3e, information for the individual child matrix patterns is extracted in a similar way.

In the above, the mother matrix pattern is formed on a Byte-to-Byte basis with 1 Byte constituting one row in the main scanning direction, and all of the child matrix patterns have the same size. It is to be noted that the numbers of bits of the mother matrix pattern and the child matrix pattern in the sub-scanning direction are at will, because there causes no problem in point of processing information due to whether or not it is on a Byte-to-Byte basis.

Meanwhile, it is preferable for both the mother matrix pattern and the child matrix pattern to be formed on a Byte-to-Byte basis in the main scanning direction for the purpose of processing information at a high speed Byte by Byte.

In the above mentioned embodiment, from this reason, the mask pattern is used so as to process also the child matrix pattern on a Byte-to-Byte basis using the foregoing logical process. When using such logical process, therefore, the child matrix patterns constituting one mother matrix pattern is not necessarily equal to one another in the size thereof. It should be understood that, if the mother matrix pattern is on a Byte-to-Byte basis, the child matrix patterns can be simply processed Byte by Byte as previously noted. On the other hand, if the bit numbers of both the mother matrix pattern and the child matrix pattern in the main scanning direction correspond to a fraction of Byte, the process becomes very complicated. In the latter case, assuming the equation of $(a \times b) = c$ Byte, where b and c are minimum integers, with an attention being paid to the bit number a of the child matrix pattern in the main scanning direction, one-line data of the child matrix pattern in the main scanning direction is written in c Byte successively b times, and the logical product between the c byte and the mask pattern for leaving the data of the required one line is then obtained, the resultant logical product data being written in the page memory or buffer memory. When the child matrix pattern locates at the leftmost position, the resultant logical product data is directly written in the page memory or buffer memory as above, but the child matrix patterns locating in other positions are written in the page memory or buffer memory after taking the logical sum between the above logical product data and the previous data in the page memory or buffer memory.

As mentioned above, there can be attained advantages that use of the large mother matrix pattern enables to increase the number of gradations, that information processing can be made easily Byte by Byte, because the mother matrix pattern is easily formed on a Byte-to-Byte basis, and that resolution is improved because of allocation of the child matrix patterns to the gradation data.

There can be further attained another advantage hat magnification of the reproduced image is variable. For example, one child matrix pattern is allocated to one gradation datum as seen in the foregoing embodiment. Since the respective child matrix patterns have different sizes (the bit numbers or dot numbers) between the division modes of child matrix patterns as shown in FIGS. 3a to 3e, magnifications of the reproduced images become different from one another depending on the division modes of child matrix patterns in FIGS. 3a to 3e.

More specifically, assuming now that one gradation datum indicates density of the entire area corresponding to four dots of the original image, the reproduced image has magnification of 1:1 relative to the original image in the division mode of child matrix patterns as shown in FIG. 3d. However, in case of the division mode of child matrix patterns as shown in FIG. 3a, the reproduced image is enlarged two times in the main scanning direction and four times in the sub-scanning direction. In case of the division mode of child matrix patterns as shown in FIG. 3b, the reproduced image is enlarged four times in the main scanning direction and two times in the sub-scanning direction. In case of the division mode of child matrix patterns as shown in FIG. 3c, the reproduced image is enlarged two times in both the main scanning direction and the sub-scanning direction. And in case of the division mode of child matrix patterns as shown in FIG. 3e, the reproduced image is reduced by half in both the main scanning direction and the sub-scanning direction.

Accordingly, if the plural division modes of child matrix patterns are set as shown in FIGS. 3c to 3e, for example, and one division mode is specified in accordance with the magnification command data M (M indicating the number of divisions), magnification of the reproduced image can be selected on demand. In order to increase the number of selectable magnifications, it is preferable to enlarge the size of the mother matrix pattern.

Figure 5:
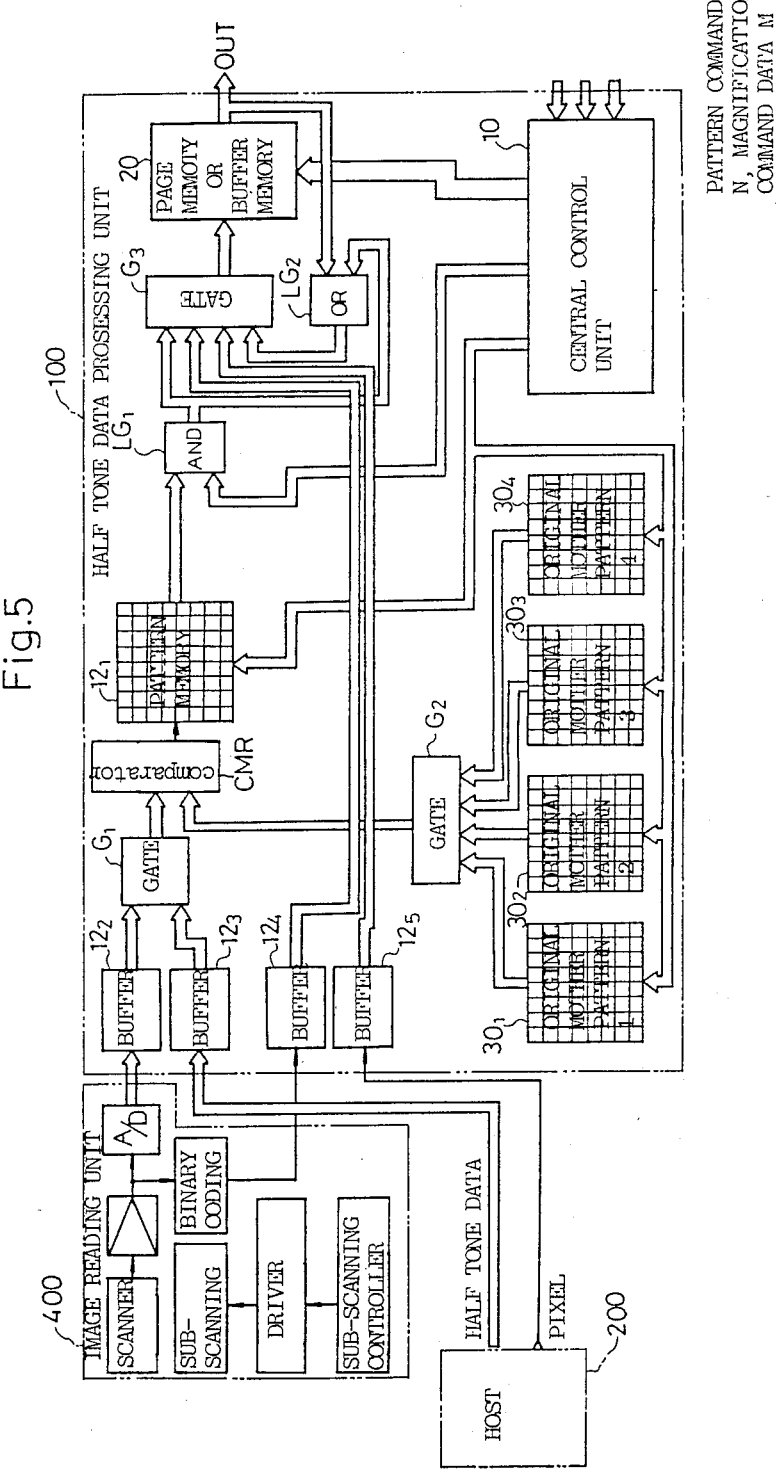
FIG. 5 is a block diagram conceptually showing the system configuration embodying the present invention by way of example.

Referring to FIG. 5, there is conceptually shown the system configuration embodying the present invention by way of example.

This system configuration is adapted for a half tone data processing unit 100 which receives gradation data from an image reading unit 400 or a host 200 such as a computer or facsimile apparatus (reception of half tone), and which develops the image information over a page memory 20 in the form of distribution of bits (or dots).

The intermediate gradation data processing unit 100 is formed not into a block-to-block configuration as shown, but of an integral computer unit in practice. For ease of understanding, it is illustrated in the form of individual hardware units with various elements in the computer unit being separated from a central control unit 10 as a computer body.

Figure 6A:
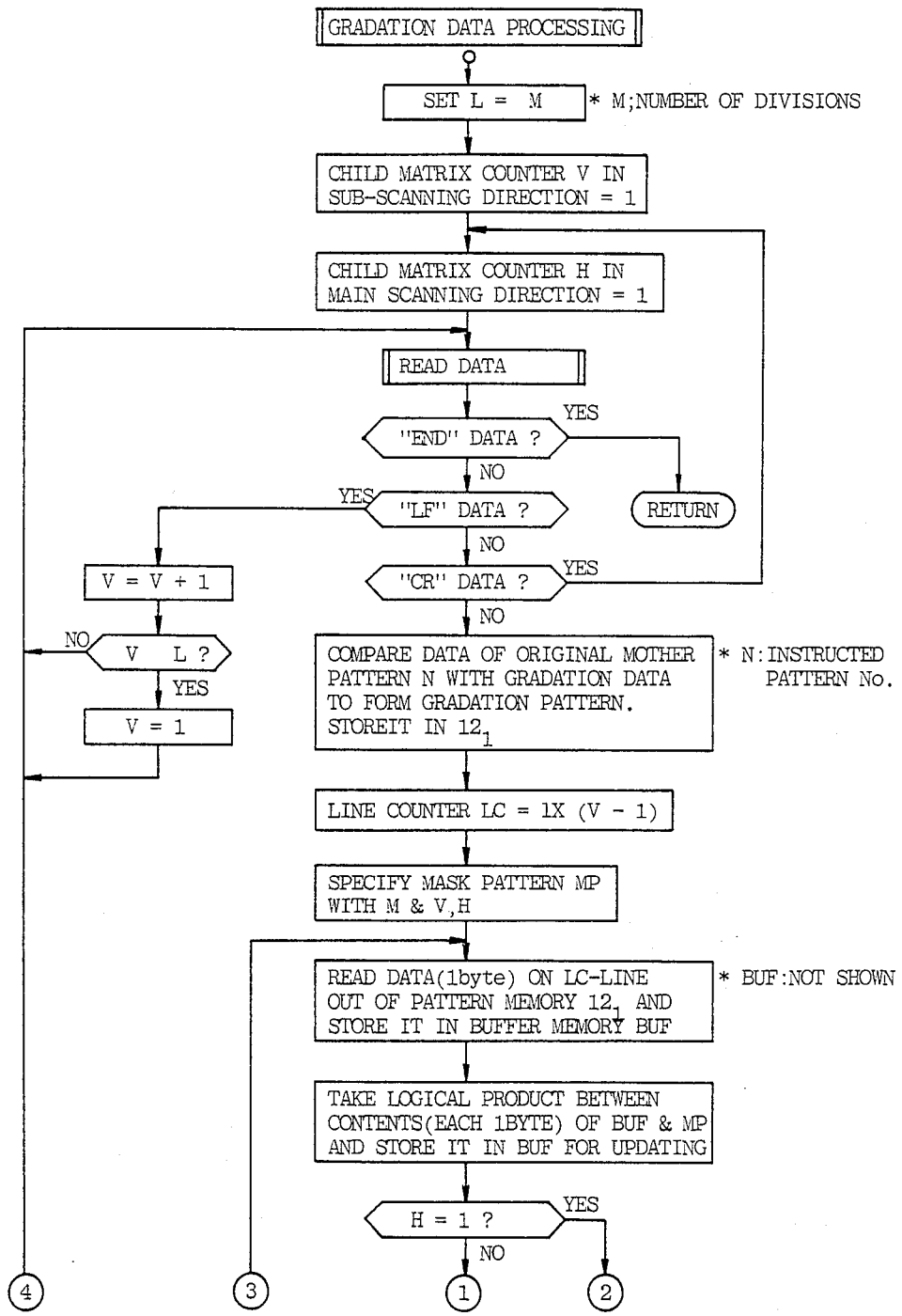
FIGS. 6a and 6b are flowcharts showing the gradation data processing operation of a computer adapted to constitute a central control unit 10 shown in FIG. 5 and a CPU board 10 shown in FIGS. 10 and 11.
Figure 6B:
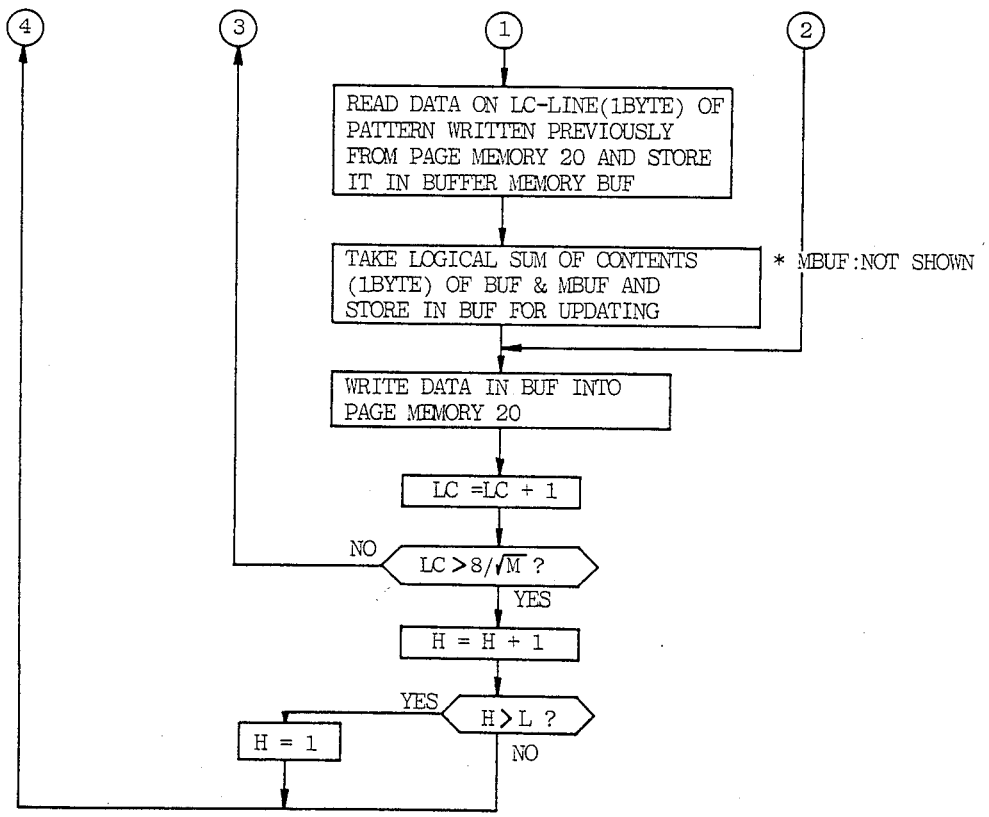

Operation of the half tone data processing unit 100 will be now described by referring to the block-to-block configuration shown in FIG. 5. FIGS. 6a and 6b show operation of data processing made by the central control unit 100. When the central control unit 10 comprising a computer proceeds to the processing of gradation data adapted to convert the gradation data received from the image reading unit 400 or the host 200 into image data, it first reads the magnification command data M (M indicating the number of divisions of one mother matrix pattern = the number of child matrix patterns included therein) and then sets the number of divisions in the main scanning direction and the sub-scanning direction, i.e., $\sqrt{M}$, in a register L. In this example, the value of M can assume any one of 4 (FIG. 3c), 16 (FIG. 3d) and 64 (FIG. 3d).

Next, the central control unit 10 sets 1 (j=1) in a counter V for grasping the position (j) of the child matrix pattern to be processed in the sub-scanning direction and 1 (i=1) in a counter H for grasping the position (i) thereof in the main scanning direction, and it reads data transmitted from the image reading unit 400 and the host 200. If the input data is of gradation data, the corresponding mother matrix pattern is then formed.

In forming of the mother matrix pattern, the central control unit 10 applies the gradation data $ICD_{ij}$ to a comparator CMR through a gate $G_1$ and, at the same time, applies the respective threshold data of the original mother pattern N (N=1–4) specified by the pattern command data N to the comparator CMR through a gate $G_2$ in due sequence. When the comparator CMR outputs "1" indicating that the gradation data $ICD_{ij}$ is equal to or larger than the threshold data, "1" is stored at 1 bit in a position on a pattern memory $12_1$ corresponding to the storage location in the original mother pattern N for the threshold data (i.e., threshold data read-out address), while when the comparator CMR outputs "0", "0" is stored in the same storage location.

As a result, the mother matrix pattern corresponding to the gradation data $ICD_{ij}$ is formed on the pattern memory $12_1$.

Next, the central control unit 10 sets the content of a line counter LC equal to the value resulted from multiplication of the content of the register L by the value which was obtained by substracting 1 from the content of the counter V.

Next, the central control unit 10 specifies the mask pattern on basis of the magnification command data M and the contents of the counters V, H. More specifically, the unit specifies the child matrix pattern $CMP_{ij}$, from which image data is to be extracted, on basis of the division number M and the contents V, H (where i denotes the content of the counter H, j denotes the content of the counter V, and M denotes the division number which indicates any one of the division modes shown in FIGS. 3c to 3e), and then specifies the matrix pattern (e.g., any one of those shown in FIGS. 4a and 4b) to be allocated to the child matrix pattern thus specified.

Next, the central control unit 10 reads out the 1 Byte data on the line (in the main scanning direction) instructed by the content of the line counter LC from the pattern memory $12_1$ and first stores the read-out data in a buffer memory BUF (not shown). It then applies both the data in the buffer memory BUF and the data of the mask pattern to an AND gate $LG_1$ to give the logical product thereof, the resultant logical product data being stored in the buffer memory BUF to become updated data. The content of the counter H is now referred.

If the content of the counter H is equal to 1, the data in the buffer memory BUF is directly written in the page memory 20, because the above indicates that the child matrix pattern from which information is extracted locates at leftmost within the mother matrix pattern.

If the content of the counter H is not equal to 1, this means that the data of the child matrix pattern at leftmost has already been written in the page memory 20 and, with this writing, the data "0" of the mask pattern has been stored in locations of the page memory where information of other child matrix patterns is to be written. Thus, the previously written pattern data (1 Byte) on the LC-th line (LC=the content of the counter LC) is read out of the page memory 20 and stored in another buffer memory MBUF, and both the data in this buffer memory MBUF and the data in the buffer memory BUF are applied to an OR gate $LG_2$ to give the logical sum thereof. The resultant logical sum data is then stored in the buffer memory BUF to become updated data, and the data in the buffer memory BUF is in turn stored in the page memory 20 to become updated data.

Next, the central control unit 10 counts up the line counter LC by one and then compares the content of the line counter LC and the line number $8/\sqrt{M}$ of the child matrix patterns. Unless the content of the line counter LC exceeds the line number $8/\sqrt{M}$, the unit proceeds to image extraction ③ for the next line. If the former exceeds the latter, the counter H is counted up by one and the content of the counter H is compared with the content of the register L. If the former is larger than the former, this means that image extraction has been completed for the child matrix pattern locating at rightmost within the mother matrix pattern in the main scanning direction. Thus, the content of the counter H is set equal to 1 allowing the next processing for the child matrix pattern as leftmost, and the unit 10 proceeds to reading of the next data.

When the data read by data reading indicates the completion of half tone processing, the central control unit 10 returns back to the main routine. When the data indicates the line feeding "LF", the counter V is counted up by one and the content of the counter V is compared with the content of the register L. If the former is larger than the latter, this means that image processing for one mother matrix pattern has been completed and, therefore, the unit sets 1 in the counter V and returns back to data reading. When the data indicates the carriage return "CR", this means that image processing for the width of one mother matrix pattern in the main scanning direction has been completed and, therefore, the unit sets 1 in the counter H and proceeds to data reading.

In the configuration of FIG. 5 referred in the above description, the buffer memories $12_1$–$12_3$ are in practice formed of internal RAM's of the computer or external RAM's, the page memory 20 is formed of an external RAM, and the memories $30_1$–$30_4$ for storing the original mother patterns 1–4 are formed of internal ROM's of the computer or external ROM's. The gates $G_1$–$G_3$, $LG_1$, $LG_2$, etc. correspond to the functions effected inside the computer.

Besides, although the above description was made by referring to the mode in which the original mother patterns 1–4 each containing threshold data are used to form the mother matrix patterns, it is also possible as an alternative that the mother matrix patterns (FIGS. 2a and 2b) are previously memorized in ROM's or RAM's and any desired one of the mother matrix patterns is selected using both the pattern command data N and the input gradation data. In this case, however, the amount of memories necessary for holding the mother matrix patterns becomes very large.

Hereinafter, there will be described one example of a practical system embodying the present invention and the configuration of the system.

Figure 10:
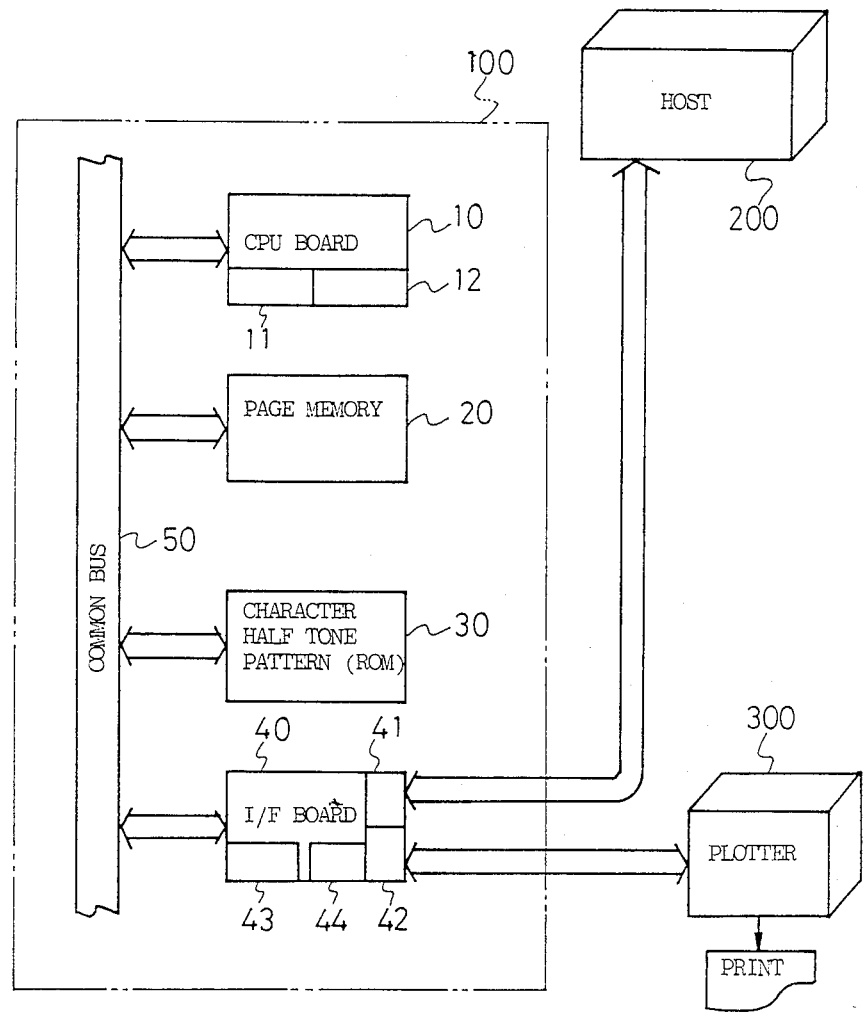
FIG. 10 is a block diagram showing the relationship between an information storage unit 100 and a host 200 as well as an output unit 300 embodying the present invention by way of example.

FIG. 10 illustrates the schematic configuration of the system. Referring to FIG. 10, designated at 100 is an information storage unit embodying the present invention by way of one exemplified mode.

The information storage unit 100 receives information from the host 200, writes bit information in the page memory of the unit 100 and then applies the bit information in the page memory to a plotter 300.

The host 200 functions to input, process and accumulate image information such as character data, coordinates data, bit information or density gradation data from word processors, plotters, tabulators, computers, scanners, key boards, data accumulation units, etc.

The plotter 300 is of a recording unit which has the ability to make dot recording. It is to be noted that the output unit is not limited to a plotter and may be formed of a CRT display or an information processing unit such as a computer, word processor or data accumulation unit.

The information storage unit 100 mainly comprises a microprocessor (hereinafter abbreviated as CPU) board 10, page memory 20, pattern memory 30, interface board 40 and a common bus 50. At initialization immediately after power-on, the control program in a ROM 11 is written in a work memory RAM 12.

Figure 11:
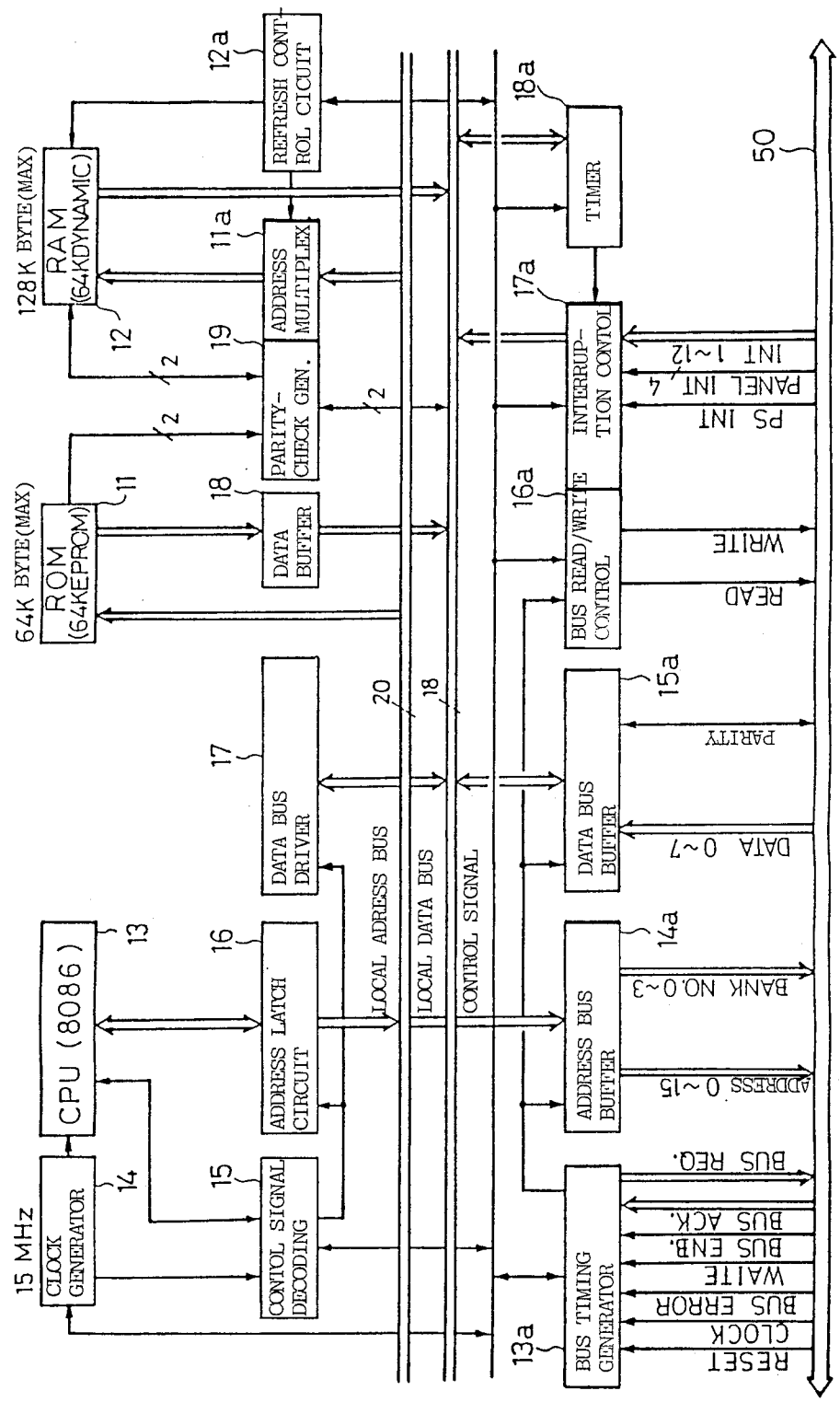
FIG. 11 is a block diagram showing the configuration of the CPU board 10 shown in FIG. 10.

Referring now to FIGS. 11, there is shown the configuration of electric elements incorporated in the CPU board 10. The CPU board 10 comprises the ROM 11 storing therein the control program, the RAM 12 serving as a work memory, a microprocessor (CPU) 13, a clock pulse generator 14, a control signal decoding circuit 15, an address latch circuit 16, a data bus driver 17, a data buffer 18, a parity check circuit 19, an address multiplexer 11a, a memory reflesh control circuit 12a a bus timing pulse generator 13a, an address bus buffer 14a, a data bus buffer 15a, a read/write control 16a, an interruption control circuit 17a a timer 18a and a common bus 50.

Figure 12:
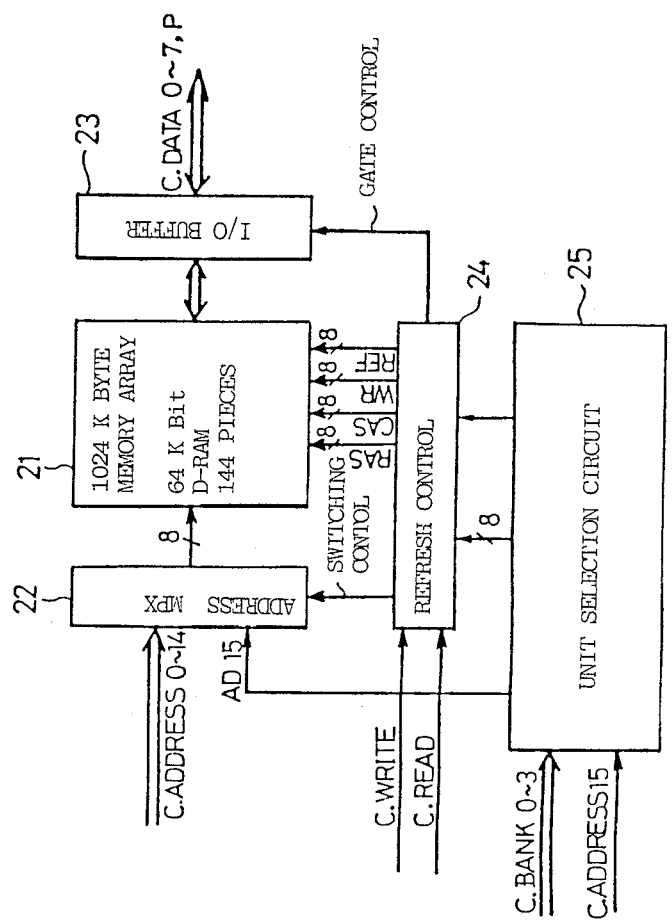
FIG. 12 is a block diagram showing the configuration of a page memory 20 shown in FIG. 10.

Referring now to FIG. 12, there is shown the configuration of the page memory 20. The page memory 20 is composed of a memory unit 21 comprising 144 pieces of 64 Kbit D-RAM's formed into an 1024 KByte memory array, an address multipleser 22, an input/output buffer 23, a refresh control circuit 24 and a unit selection circuit 25.

Figure 13:
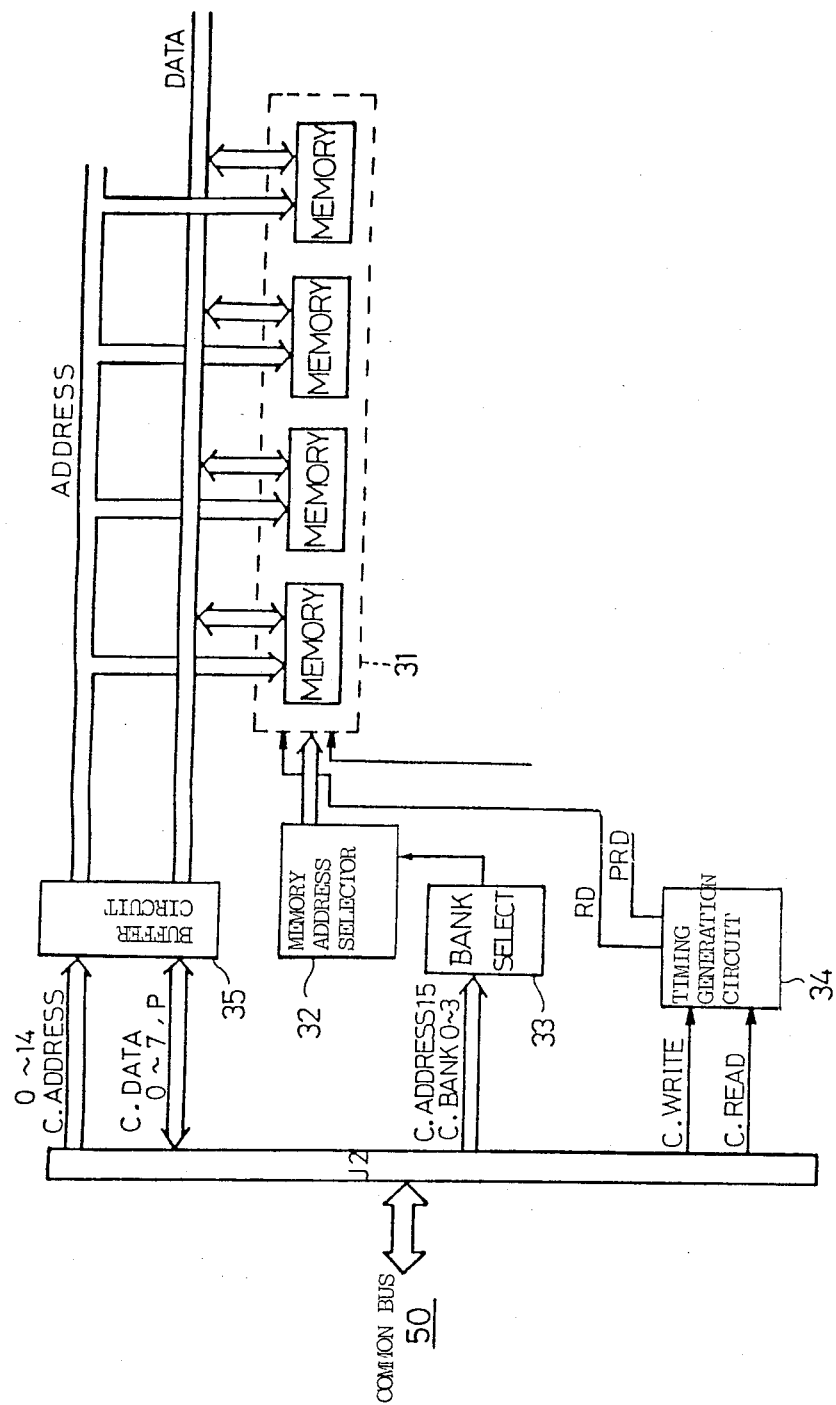
FIG. 13 is a block diagram showing the configuration of a pattern ROM shown in FIG. 10.

Referring now to FIG. 13, there is shown the configuration of the pattern memory 30. The pattern memory 30 incorporates a memory array 31 for storing therein bit information in the form of a character pattern (vertical 48 lines=48 dots and horizontal 3 Byte=24 dots for one character) as well as threshold information of the original mother patterns 1-4 (64 Byte for each pattern). The character patterns include Japanese characters, alphabets, numerals and other required characters and symbols, and the original mother patterns include four types different from one another in properties such as contrast and density.

In addition to the memory array 31, the pattern memory 30 incorporates a memory address selector 32 for writing pattern information in the memory array 31 and reading pattern information out of the memory array 31, a memory bank selector 33, a timing pulse generator 34 and a buffer 35. J2 denotes a connection terminal section.

Figure 14:
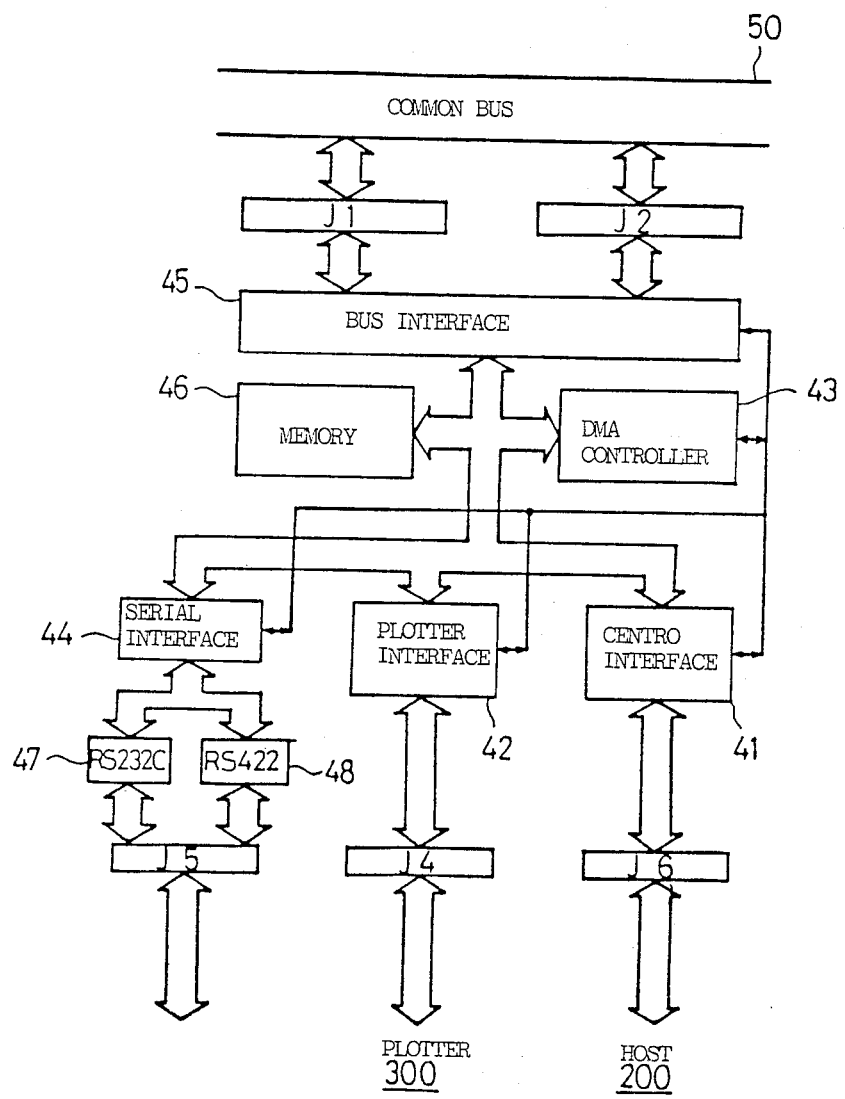
FIG. 14 is a block diagram showing the configuration of an interface board 40 shown in FIG. 10.

Referring now to FIG. 14, there is shown the configuration of the interface board 40. The interface board 40 is composed of a centronics interface 41 as an interface with the host 200, a plotter interface 42 as an interface with the plotter 300, a serial interface 44 for transferring data to and from other external equipments in a serial manner, a DMA (Direct Memory Access) controller 43, a bus interface 45, an input/output buffer memory 46, an RS232C (serial interafce) 47 and an RS422 48. The centronics interface 41 is of a parallel interface and receives data from the host 200. The plotter interface 42 is of an output interface and outputs page data to the plotter. The serial interface 44 is of a bidirectional interface to send and receive data. The buffer memory 46 can be used as a part of the work memory or bit memory (page memory) for extension thereof.

Hereinafter, there will be described in more detail functions of the respective elements.

Memory Unit 21

Figure 15:
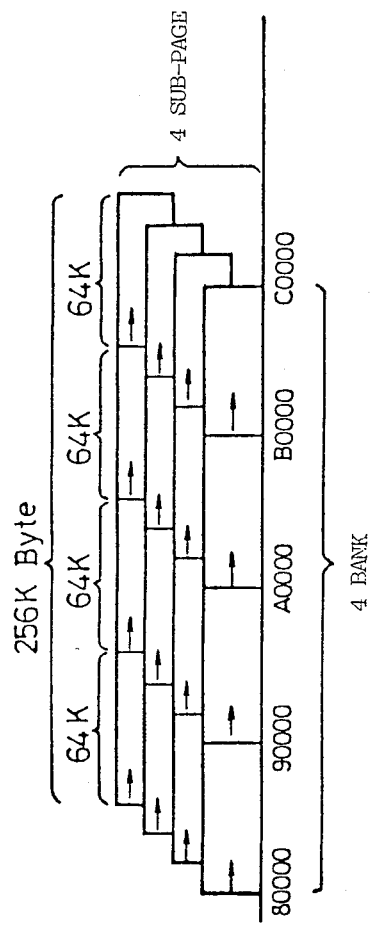
FIG. 15 is an explanatory view showing memory partition of the page memory 20.

The memory unit 21 is divided into four sub-pages in point of partition of addresses, each of which is in turn divided into four banks. This is shown in FIG. 15. Numerical representation of addresses in FIG. 15 is of hexadecimal notation (unually denoted by H).

In case of performing DMA transfer, since the DMA controller 43 has CPU No., WRITE of PAGE No. of the transfer data is made to the I/O area of the controller 43 corresponding to CPU 13 to control the DMA controller 43. In case of memory erasing for the memory unit 21, WRITE of MSB bit ON data is made to the I/O area with PAGE No. being at will, and data is written in 8000H-8FFFFH of 64 KByte. It is possible to write data in all locations of the memory simultaneously on a 64 KByte-to-64 KByte basis. When data ("0" upon erasing) is written, the same data is simultaneously written on 64 KByte-to-64 KByte basis in the direction of arrows in FIG. 15. As a result, the time required for memory erasing is very short.

Interface Board 40

The plotter interface 42 transfers the data in the memory unit 30 in accordance with operation of the DMA controller 43 in synchronous relation with clocks from the plotter 300. The DMA controller 43 transfers the data in a block mode 300 Byte by 300 Byte and returns the common bus 50 back to the CPU 13 when transfer of 300 Byte has been completed. Commands to the plotter 300 and status from the plotter are both read out by the CPU 13.

The centronics interface 41 controls data transfer between the CPU 13 or DMA controller 43 and the host 200. In case the CPU 13 directly reads the data, an interruption is occurred upon a strobe signal from the host 200 and an acknowledge signal is generated upon data reading by CPU 13. In case the DMA controller 43 transfers the data, a DMA request is sent to the DMA controller 43 when receiving a strobe signal. The serial interface 44 controls serial transmission/reception of data by the DMA controller 43 or the CPU 13. In case of using the DMA controller 43, the serial interface 44 issues a DMA request when the transmission buffer became vacant or when the data was input in the reception buffer. In case the CPU 13 directly handles the transmission/reception data, an interruption is occurred to send a service request to the CPU 13.

The buffer memory 46 is of a memory having addresses of FC000-FDFFF and it is accessable by the CPU 13 and the DMA controller 43. By turning off a dip switch, the memory 46 is disabled.

There will now be described the set sequence of the DMA controller 43. First, the command register is specified, the bank No. is specified, the DMA transfer address is specified, the Byte number for DMA transfer is specified, the mode register is specified, and the mask register is reset. This causes DMA to start. Upon the completion of DMA, the mask register is set.

The plotter interface 42 reads status of the plotter 300 and, when recording is capable, it sets the DMA controller 43 and specifies the command to be set. At the time when the command is specified, data transfer under interruption is started and, after data transfer for all lines has been repeated necessary times corresponding to the set number of sheets, the DMA mask register is set.

The centronics interface 41 sets the DMA controller 43 in case of DMA transfer, and thereafter it transfers the data under interruption and sets the DMA mask register upon the completion of data transfer.

The serial interface 44 sets the DMA controller 43, sets the serial mode and sets the serial command in case of DMA transfer. This causes data transfer to start under interruption. Upon the completion of data transfer, it sets the DMA mask register.

The bit map, data transfer, command format, etc. of the page memory are as follows.

(1) Basic Mode a. Bit map size of the page memory
Vertical 3296 bits (lines)×horizontal 2400 bits, 412 Byte×300 Byte b. Bit map writing system Overall package horizontal sequential scanning (in synchronous relation with external clocks)

c. Bit map reading system

Overall package horizontal sequential scanning (in synchronous relation with external clocks)

d. Data transfer mode (reception)
  (i) Sentence (text) mode
  (ii) Half tone mode
  (iii) Bit image mode e. Intermediate gradation representation Four types (groups) of gradations. Each group has 64 steps of density gradations. One pattern (mother matrix pattern) is of a (8×8) dot square matrix. The child matrix pattern can have three types of (4×4), (2×2) and (1×1) dot square matrixes.

f. Print area corresponding to the bit map

Vertical length 278 mm × horizontal length 203 mm

(2) Bit map of the page memory a. Horizontal four divisions (division into four sub-pages)

One sub-page includes 824 line (bits) × 2400 bits. Each sub-page comprises four banks.

b. Address designation system

Relative addresses with the instructed start position (the start position is an absolute address). The origin of coordinates locates at the upper, left position.

The start address is common to all modes (i), (ii) and (iii). Byte (8 bit)-to-Byte (8 bit) basis in the x (horizontal:trasverse) direction. Also, Byte (8 bit : 8 line)-to-Byte (8 bit:8 line) basis in the y (vertical:lengthwise) direction.

c. Address unit

Horizontal direction: Byte-to-Byte basis (from left to right)

Vertical direction: line-to-line basis (from above to bottom)

d. End address designation

The end address is of a relative address with the start position being as reference and corresponds to the counted number of data.

In case of (i) text mode, there is no instruction. The end address is determined on basis of the character size, character pitch, LF amount (line feeding amount) and the number of rows.

In case of (ii) half tone mode, the end address is instructed by the number of partitions (on a 1 Byte-to-1 Byte basis) in the horizontal direction and by the number of partitions (on a 8 line:1 Byte-to-8 line:1 Byte basis) in the vertical direction.

In case of (iii) bit image mode, the end address is instructed on a Byte-to-Byte basis in the horizontal direction and on a line (bit)-to-line (bit) basis in the vertical direction.

d. Effective Data

It is a range of data which can be written in the bit map memory (vertical 3296 × horizontal 2400 dots). The data (bit) overflowed from this range (write enable region) becomes invalid. In case of (i) text mode, it is a range which does not exceed the maximum of existing addresses.

(3) Data transfer a. Alphabets, numerals, Katakana of character data (character code data) conform with JIS C-6220. Symbols on a 8-to-8 basis are used. In case of the Chinese character mode, JIS C-6226 should be conformed.

b. Half tone density data

1 Byte/partition; Binary (0–64). Partition=pattern=8×8 bit.

It is to be noted that, because there was 32 types of functional character codes 0–31 which occupy the Binary codes 0–31 and alphabets, numerals and symbols are allocated to the Binary codes 32–127, to avoid confusion with the above codes the data specifiying density gradations 0–63 is given with the value resulted from addition of 128 to the value indicating the actual data and, at the time of decoding, 128 is subtracted from the content of the gradation data to obtain the actual gradation command value.

c. Bit image data 1 bit/pel: Byte-to-Byte basis MSB . . . L (pel at left end) LSB . . . R (pel at right end)

d. Numerical data

Binary: Byte-to-Byte basis e. Sequence of data transfer

From MSD to LSD (from L to R: transfer Bytes from 1 Byte at left end rightward in sequence).

f. Control code

JIS C - 6220, functional character code using symbols on an 8-to-8 basis and extension control code using ESS code in combination. The command in case of using ESS code is completed with SP. SP=Space.

The information storage unit 100 receives the character code, the half tone gradation code or the bit image data from the host 200 and stores the code in the buffer memory temporarily. Then, the character code is converted to a character pattern (pattern of horizontal 24 dots × vertical 48 dots) and, as required, is subjected to angle doubling processing, length halving processing or etc in accordance with the instruction. The half tone gradation code is converted to image data following the flow shown in FIGS. *6a* and *6b,* the image data being written in the page memory.

Thereafter, in accordance with the instruction from the host 200, the bit data in the page memory is DMA-transferred Byte by Byte to the output unit 300 or the host 200 directly or after either enlargement or reduction processing.

As previously noted, read/write addresses of the page memory are on a Byte-to-Byte basis (from left to right) in the horizontal (transverse) direction and on a line-to-line basis (from above to bottom) in the vertical direction, and the start address is common to all modes (i), (ii) and (iii) and it is determined on a Byte (8 bit)-to-Byte (8 bit) basis in the x (horizontal:transverse) direction and also on a Byte (8 bit:8 line)-to-Byte (8 bit:8 line) basis in the y (vertical:lengthwise) direction. Although the start address is determined on a Byte-to-Byte basis in this way, it is not necessarily required for the number of vertical bits in the pattern matrix to be set on a Byte-to-Byte basis. This is because the start address is merely a start point for reading/writing of the page memory.

However, since the read/write addresses are set on a Byte-to-Byte basis in the main scanning direction, it is needed to process the above mentiioned matrix pattern data of the present invention Byte by Byte. From this reason, the information storage unit 100 first receives the gradation data from the host 200 and, in case of the gradation data which is to be allocated to the child matrix pattern locating at the leftmost position in the mother matrix pattern, the corresponding mother matrix pattern is specified with the gradation data, and the logical product between the data on each line of the specified pattern (8-bit in the main scanning direction, 8-bit in the subscanning direction) in the main scanning direction and each 1 Byte of the mask pattern (the content if FOH) is taken, the resultant logical product being written in the page memory.

In case of the gradation data which is to be allocated to the child matrix pattern not locating at the leftmost position in the mother matrix pattern, the corresponding mother matrix pattern is specified with the gradation data, and the logical product between the data on each line of the specified pattern in the main scanning direction and each 1 Byte of the mask pattern is first taken, and further the logical sum between the logical product and the data previously written in the page memory, the resultant logical sum being stored in the page memory to become as updated data.

Moreover, in case the mother matrix pattern has the number of bits (e.g., 12 bits) in the main scanning direction which corresponds to a fraction of Byte and the child matrix pattern has the number of bits (e.g., 6 bits) in the main scanning direction which corresponds to a fraction of Byte, the following relationship is obtained.

$$a \times b = c \text{ Byte},$$

for example a=6 bits, b=4, and c=3 Byte
Assuming that, for example, the following eight gradation data constituting two mother matrix patterns;

| $ICD_{11}$ $ICD_{21}$ | $ICD_{31}$ $ICD_{41}$ |
|---|---|
| $ICD_{12}$ $ICD_{22}$ | $ICD_{32}$ $ICD_{42}$ | are used to determine the respective mother matrix patterns, and, the following child matrix patterns of such mother matrix patterns;

| $CMP_{11}$ $CMP_{21}$ | $CMP_{31}$ $CMP_{41}$ |
|---|---|
| $CMP_{12}$ $CMP_{22}$ | $CMP_{32}$ $CMP_{42}$ | are used to extract information therefrom, the data on each line of the child matrix patterns is successively written in the buffer memory of 3 Byte 4 times (b=4), and the logical product between the written data and a mask pattern is taken to extract the image data for each line of the child matrix patterns. The content of the mask pattern is set as follows.

For a first mask pattern used for extracting $CMP_{11}$ and $CMP_{12}$:

| First Byte | Second Byte | Third Byte |
|---|---|---|
| FCH | F0H | 00H |

For a second mask pattern used for extracting $CMP_{21}$ and $CMP_{22}$:

| First Byte | Second Byte | Third Byte |
|---|---|---|
| 03H | F0H | 00H |

For a third mask pattern used for extracting $CMP_{31}$ and $CMP_{32}$:

| First Byte | Second Byte | Third Byte |
|---|---|---|
| 00H | 0FH | C0H |

For a fourth mask pattern used for extracting $CMP_{41}$ and $CMP_{42}$:

| First Byte | Second Byte | Third Byte |
|---|---|---|
| 00H | 00H | 3FH |

In case of extracting the pattern data of $CMP_{11}$ and $CMP_{12}$, the logical product between the content of the 3 Byte buffer memory, in which the data of one line has been successively written four times (b=4), and the content of the first mask pattern is directly written in the page memory.

In case of extracting the pattern data of $CMP_{21}$ and $CMP_{22}$, $CMP_{31}$ and $CMP_{32}$ as well as $CMP_{41}$ and $CMP_{42}$, the logical product between the content of the 3 Byte buffer memory, in which the data of one line has been successively written four times (b=4), and the content of the second, third or fourth times (b=4), and the content of the second, third or fourth mask pattern is first taken, and the logical sum between the resultant logical product and the data previously written in the page memory is then taken, the resultant logical sum being stored in the page memory to become updated data.

In this way, if the number of bits of the mother matrix pattern in the main scanning direction corresponds to a fraction of Byte and the number of bits a (e.g., a=6) of the child matrix pattern in the main scanning direction also corresponds to a fraction of Byte, the data on each line is successively written in the c Byte buffer memory minimum integer (e.g., four) times, the integer satisfying the equation of $a \times b = c$ Byte, and the data in the memory is then processed to obtain the logical product using the 3 Byte mask pattern, or the locations in 3 Byte where the data has not been contained in practice are allocated to the data in combination with the logical sum, the data having been processed similarly to obtain the logical product and being to be assigned to those locations. Thus, after writing into the 3 Byte buffer memory, all the data can be processed at a high speed on a Byte-to-Byte basis. This causes even the mother matrix pattern with one side thereof containing bits, which correspond to a fraction of Byte, to be used easily.

Although, in the above description the child matrixes from which image data is extracted were set to be arranged within the mother matrix in the given sequence even with the selected mother matrix patterns different from one another, it is advantageous to set the child matrixes at random rather than at the given sequence in case of the need of shading-off with positive intention or restraining meshes, cross stripes, etc. As an alternative, the selection sequence of child matrixes may be of the given sequence only in a range of the same gradation data. More specifically, when one gradation datum has arrived, the position (within the mother matrix pattern) of final one of the child matrix patterns which have been previously extracted for such gradation data is referred to, and the child matrix pattern to now be extracted is set at the next position. The position of this child matrix pattern (within the mother matrix pattern) is then memorized and held as final one. The selection sequence of child matrix patterns may be set otherwise in accordance with an intention.

Further, although a characteristic of gradation representation (one of the original mother patterns) was specified with the pattern command data N and both resolution and reproduced magnification are specified with the magnification command data M in the aforementioned embodiment, characteristics of image reproduction can be adjusted, set and selected also in accordance with the extraction sequence of child matrix patterns within the mother matrix pattern.

According to the present invention, as fully described in the above, since the mother matrix pattern in the form of a large matrix is selected with the gradation data and image information is extracted from the child matrix pattern resulted from division on the selected mother matrix pattern, there can be attained advantages as follows. Gradation representation becomes superior at the same level as realized by the number of gradation representations of the mother matrix pattern, and resolution becomes as high as that determined by the size of the child matrix pattern, thus ensuring a variety of half tone representations. In particular, there can be obtained high resolution in case of reproducing contrast or profiles.

Various modifications will become possible for those skilled in the art after receiving the teachings of the present disclosure without departing from the scope thereof.

What is claimed is:

1. A method of processing gradation image information for producing printed forms, said method comprising the steps of:
   scanning individual picture elements of a picture original;
   determining the gradation values of each picture element;
   retrieving a predetermined mother matrix pattern from a storage memory, said mother matrix pattern having the same gradation value as the determined gradation value of the original picture element;
   forming a plurality of sub-matrix patterns made up of displayable patterns, each of said sub-matrix patterns forming part of said mother matrix pattern;
   substituting the sub-matrix patterns for parts of said mother matrix pattern in accordance with a predetermined set of rules; and
   reproducing said sub-matrix patterns in eye-readable form to duplicate said individual picture elements.

2. A method for reproducing picture forms using predetermined patterns corresponding to gradation values, said method comprising the steps of:
   determining the gradation value of a picture element of a picture original;
   selecting from a storage memory for each one of the gradation values of the picture elements of the picture original, a predetermined mother matrix pattern having at least the same gradation value corresponding to the gradation value of an original picture element;
   forming, for each one of said gradation values, a sub-matrix pattern which is a part of the mother matrix pattern;
   substituting the part of said mother matrix pattern with said sub-matrix pattern in accordance with a predetermined set of rules; and
   reproducing in eye-readable form the formed sub-matrix patterns in a combination in which each one of the sub-matrix patterns corresponds to each one of said picture elements of the picture original.

3. A method of processing gradation information as claimed in claim 2, wherein, assuming that a mother matrix pattern MMP is divided into (m×n) child matrix patterns $CMP_{11}$–$CMP_{mn}$ comprising m patterns in the main scanning direction and n patterns in the sub-scanning direction, where the first foot-character denotes the position of each child matrix pattern within the mother matrix pattern in the main scanning direction and the latter foot-character denotes the position thereof in the sub-scanning direction, said mother matrix pattern being expressed by:

$$MMP = \sum_{j=1}^{n} \sum_{i=1}^{m} CMP_{ij}$$

and image information corresponding to one mother matrix pattern is obtained with (m×n) gradation data $$\sum_{j=1}^{n} \sum_{i=1}^{m} ICD_{ij}$$

comprising $ICD_{11}$–$ICD_{mn}$ similarly, information of said child matrix pattern $CMP_{ij}$ in the mother matrix pattern specified with said gradation data $ICD_{ij}$ is obtained as information in the form of bit distribution for said gradation data $ICD_{ij}$.

4. A method of processing gradation information as claimed in claim 3, wherein information of said child matrix pattern $CMP_{ij}$ in the mother matrix pattern specified with said gradation data $ICD_{ij}$ is obtained through logical processing of both information of said mother matrix pattern and mask data which has extraction information in its parts corresponding to said child matrix pattern $CMP_{ij}$ and has non-extraction information in its parts not corresponding thereto.

5. A method of processing gradation information as claimed in claim 4, wherein said logical processing is performed on a Byte-to-Byte basis.

6. A method of processing gradation information as claimed in claim 4 or 5, wherein, when the number of bits of said mother matrix pattern in the main scanning direction corresponds to a fraction of Byte and the number of bits a of said child matrix pattern in the main scanning direction also corresponds to a fraction of Byte, assuming the equation of $a \times b = c$ Byte, where b and c are both minimum integers, a bits of said child matrix pattern $CMP_{ij}$ in the main scanning direction is written in a c Byte memory successively b times, and the content of said memory and said mask data are then subjected to logical processing.

7. A method of processing gradation information as claimed in claim 1, wherein, assuming that a mother matrix pattern MMP is divided into (m×n) child matrix patterns $CMP_{11}$–$CMP_{mn}$ comprising m patterns in the main scanning direction and n patterns in the sub-scanning direction, where the first foot-character denotes the position of each child matrix pattern within the mother matrix pattern in the main scanning direction and the latter foot-character denotes the position thereof in the sub-scanning direction, said mother matrix pattern being expressed by:

$$MMP = \sum_{j=1}^{n} \sum_{i=1}^{m} CMP_{ij}$$

and image information corresponding to one mother matrix pattern is obtained with (m×n) gradation data $$\sum_{j=1}^{n} \sum_{i=1}^{m} ICD_{ij}$$

comprising $ICD_{11}$–$ICD_{mn}$ similarly, information of said child matrix pattern $CMP_{ij}$ in the mother matrix pattern specified with said gradation data $ICD_{ij}$ is obtained as information in the form of bit distribution for said gradation data $ICD_{ij}$.

8. A method of processing gradation information as claimed in claim 7, wherein information of said child matrix pattern $CMP_{ij}$ in the mother matrix pattern specified with said gradation data $ICD_{ij}$ is obtained through logical processing of both information of said mother matrix pattern and mask data which has extraction information in its parts corresponding to said child matrix pattern $CMP_{ij}$ and has non-extraction information in its parts not corresponding thereto.

9. A method of processing gradation information as claimed in claim 8, wherein said logical processing is performed on a Byte-to-Byte basis.

10. A method of processing gradation information as claimed in claim 8 or 9, wherein said logical processing is of logical product processing.

11. A method of processing gradation information as claimed in claim 8 or 9, wherein, when the number of bits of said mother matrix pattern in the main scanning direction corresponds to a fraction of Byte and the number of bits a of said child matrix pattern in the main scanning direction also corresponds to a fraction of Byte, assuming the equation of $a \times b = c$ Byte, where b and c are both minimum integers, a bits of said child matrix pattern $CMP_{ij}$ in the main scanning direction is written in a c Byte memory successively b times, and the content of said memory and said mask data are then subjected to logical processing.

* * * * *